United States Patent [19]
Burdon et al.

[11] Patent Number: 6,146,583
[45] Date of Patent: *Nov. 14, 2000

[54] ALLOY STEEL COMPOSITION AND CHAIN PRODUCTS FABRICATED IN SUCH ALLOY STEEL

[75] Inventors: Christopher Burdon, Kidderminster; Geoffrey David Smyth Price, Bridgenorth, both of United Kingdom

[73] Assignee: Parsons Chain Company Limited, Stourport-on-Severn, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 09/091,468
[22] PCT Filed: Dec. 20, 1996
[86] PCT No.: PCT/GB96/03117
§ 371 Date: Oct. 15, 1998
§ 102(e) Date: Oct. 15, 1998
[87] PCT Pub. No.: WO97/22727
PCT Pub. Date: Jun. 26, 1997

[30]    Foreign Application Priority Data

Dec. 20, 1995 [GB] United Kingdom ................... 9526079

[51] Int. Cl.⁷ .................................................. C22C 38/46
[52] U.S. Cl. ........................................... 420/109; 148/335
[58] Field of Search .............................. 420/109; 148/335

[56]    References Cited
FOREIGN PATENT DOCUMENTS

| | | |
|---|---|---|
| 2139115 | 2/1973 | Germany . |
| 0596656 | 3/1978 | Russian Federation ............... 148/335 |
| 1162174 | 8/1969 | United Kingdom . |
| WO 9004659 | 5/1990 | WIPO . |

OTHER PUBLICATIONS

PCT International Search Report, Application No. PCT/GB96/03117, pp. 1–4.
Ann. Chim., vol. 6, No. 3, 1981, pp. 225–236, XP000653543.
Association Technique De Traitement Thermique (ATTT) XP000653532, copyright 1994, PYC Edition 5, Ivry–Sur–Seine ISBN 2 85330–133–8, pp. 111–119.
Zvaranie, vol. 22, copyright 1973, pp. 301–307, XP002029918.
Excerpt from Database Registry in Host STN XP002029919, 1981.
Thyssen Edelstahl Tech. Ber., vol. 6, No. 2, 1980, pp. 104–110, XP000653333.
Derwent Abstract, 76210B, 1979.
Derwent Abstract, 47872R, 1970.

*Primary Examiner*—Deborah Yee
*Attorney, Agent, or Firm*—Shlesinger, Arkwright & Garvey LLP

[57]    ABSTRACT

A steel alloy for fabricating into chain links particularly for a mining chain having a composition including nickel in the range of 0.3 to 1.5%, particularly 1%, chromium in the range of 0.2 to 1.0%, particularly 0.5%, molybdenum in the range of 0.1 to 1.0%, particularly 0.75%, carbon in the range of 0.15 to 0.28%, particularly 0.23%, vanadium in the range of 0.05 to 0.2%, particularly 0.1%, and the balance iron. The steel alloy enables the fabrication of mining chain having an acceptable stress corrosion resistance to aggressive conditions likely to be encountered in mining without sacrificing hardness and strength in comparison with a conventional composition steel chain.

7 Claims, No Drawings

ALLOY STEEL COMPOSITION AND CHAIN PRODUCTS FABRICATED IN SUCH ALLOY STEEL

This application is a 371 of PCT/GB96/03117 dated Dec. 20, 1996.

This invention relates to steel alloys and to chain links and associated products fabricated of such alloys.

Chain links are formed by taking a portion of steel alloy rod as feedstock, subjecting the portion to a bending operation to bend the portion into a chain link shape with ends of the portion abutting a central part of a limb of the chain link shape and electric arc welding together the said ends to form the chain link. During the bending process, the portions are either interlinked together, or to alternate links forged into shape previously, in sequence, and the welding, in turn, is effected sequentially to form a continuous chain length of interlinked links. The continuous chain length is then heat treated to develop a requisite strength and toughness in the chain links.

To produce high performance chain lengths it is conventional to utilise a low alloy steel feedstock with a typical analysis of:

| | |
|---|---|
| Nickel | 0.75% |
| Chromium | 0.5% |
| Molybdenum | 0.5% |
| Carbon | 0.23% |
| Iron | balance |

The alloy material content increases the hardenability of the steel and enables the temperature at which the chain is tempered to be raised in comparison with a mild steel whilst retaining strength. The strength is largely governed by the carbon content, but both alloy content and carbon content must be kept low in order to maintain good, reliable, weldability of the feedstock.

It is known in the general field of alloy steel that vanadium may be used as a substitute for, or in addition to, molybdenum to improve the hardenability and temper resistance of alloy steel. Thus the molybdenum content may be replaced or augmented by a somewhat smaller content of vanadium to form an alloy having similar properties to the alloy containing molybdenum alone.

According to the present invention there is provided a steel alloy for fabricating into chain links having a composition including nickel in the range of 0.3 to 1.5%, chromium in the range of 0.2 to 1.0%, molybdenum in the range of 0.1 to 1.0%, carbon in the range of 0.15 to 0.28% and vanadium in the range of 0.05 to 0.2%.

Preferably the steel alloy has a molybdenum content in the range of 0.2 to 0.8% and a vanadium content in the range of 0.05 to 0.15%.

Desirably the steel alloy has a composition including nickel 1.0%, chromium 0.5%, molybdenum 0.75%, carbon 0.23% and vanadium 0.1%.

Steel alloys as set out having a vanadium content in addition to a molybdenum content have a weldability only marginally inferior to that of the corresponding steel alloy not containing a vanadium content but have an increased temper resistance.

In one example, by increasing the tempering temperature from 480° C. to 600° C. of a typical high strength chain, such as grade 80 industrial chain or DIN grade 2 mining chain, by the addition of vanadium to the steel alloy, a very high resistance to stress corrosion cracking is found as measured by $K_{1_{scc}}$ to the extent that the chain strength was effectively immune from the effect of the working environment. The steel alloy has a better than normal toughness and stress corrosion resistance at higher than normal hardness, that is, higher than normal strength.

Chain links and associated products are frequently required to operate in specific, adverse, environments such as in marine applications, mining operations involving adverse geo-chemical conditions, particularly those involving mildly acidified chlorides and sulphides, or in particular chemical environments. Hitherto, requirements of toughness and resistance to stress corrosion have necessitated the utilisation of a steel alloy of lesser strength than that utilised for conventional chain.

Utilising the steel alloy of the present invention enables the fabrication of mining chain having an acceptable stress corrosion resistance to aggressive conditions likely to be encountered in mining without sacrificing hardness and strength in comparison with a conventional composition steel chain.

In comparison, a chain fabricated of stainless steel alloy is only likely to have a tensile strength corresponding to an industrial grade 50 chain. Whilst a chain fabricated of the steel alloy of the present invention will not have the corrosion resistance of stainless steel, it will have an acceptable corrosion resistance in certain mildly aggressive chemical environments and, at the same time, have a tensile strength appreciably in excess of that of stainless steel. Thus a chain of alloy steel according to the present invention could be expected to have the tensile strength of at least an industrial grade 80 chain or mining DIN grade 2 chain in comparison with a stainless steel alloy chain which could be expected to have the tensile strength of an industrial grade 50 chain at the highest.

What is claimed is:

1. A steel alloy chain, comprising:
   a) a plurality of chain links having a composition consisting of nickel in the range of 0.3 to 1.5%, chromium in the range of 0.2 to 1.0%, molybdenum in the range of 0.1 to 1.0%, carbon in the range of 0.15 to 0.28%, and vanadium in the range of 0.05 to 0.2%, and the balance of the composition being iron.

2. A steel alloy chain as defined in claim 1, wherein;
   a) the alloy has a molybdenum content in the range of 0.2 to 0.8% and a vanadium content in the range of 0.05 to 0.15%.

3. A steel alloy chain as in claim wherein;
   a) the alloy has a composition including a nickel content of 1.0%, a chromium content of 0.5%, a molybdenum content of 0.75%, a carbon content of 0.23%, and a vanadium content of 0.1%.

4. A steel alloy chain as in claim 1, wherein;
   a) the alloy has a nickel content of 1.0%, a chromium content of 0.5%, a molybdenum content of 0.75%, and a vanadium content of 0.1%.

5. A steel alloy chain having increased corrosion resistance and tensile strength, said steel alloy chain comprising:
   a) a plurality of chain links having a composition consisting of nickel in the range of 0.3 to 1.5%, chromium in the range of 0.2 to 1.0%, molybdenum in the range of 0.1 to 1.0%, carbon in the range of 0.15 to 0.28%, and vanadium in the range of 0.05 to 0.2%, and the balance of the composition being iron; and
   b) said steel alloy chain having resistance to stress corrosion cracking, and having been tempered at about 600° C.

6. A steel alloy chain as defined in claim 5, wherein;
   a) the alloy has a molybdenum content in the range of 0.2 to 0.8% and a vanadium content in the range of 0.05 to 0.15%.

7. A steel alloy chain as in claim 6, wherein;
   a) the alloy has a composition including a nickel content of 1.0%, a chromium content of 0.5%, a molybdenum content of 0.75%, a carbon content of 0.23%, and a vanadium content of 0.1%.

* * * * *